United States Patent
Ravenell (10) Patent No.: US 6,678,915 B1
(45) Date of Patent: Jan. 20, 2004

(54) HEATED WINDSHIELD WIPER BLADES

(76) Inventor: Preston L Ravenell, 275 Winthrope Ave., New Haven, CT (US) 06511-5137

( * ) Notice: Subject to any disclaimer, the term of this patent is extended or adjusted under 35 U.S.C. 154(b) by 0 days.

(21) Appl. No.: 10/044,086

(22) Filed: Dec. 24, 2001

(51) Int. Cl.[7] .............................. B60S 1/32; B60S 1/34
(52) U.S. Cl. .............................. 15/250.07; 15/250.05; 15/250.351; 219/202
(58) Field of Search .................. 15/250.05, 250.06, 15/250.07, 250.08, 250.09, 250.351; 219/202, 203

(56) References Cited

U.S. PATENT DOCUMENTS 2,677,143 A * 5/1954 Bianey ............... 15/250.07

FOREIGN PATENT DOCUMENTS

| DE | 2105774 | * | 9/1971 | ............ 15/250.05 |
| JP | 2-11443 | * | 1/1990 | ............ 15/250.351 |

* cited by examiner

Primary Examiner—Gary K. Graham
(74) Attorney, Agent, or Firm—Michael I. Kroll (57) ABSTRACT

The present invention 10 discloses an electrical heating element 16 welded at 26 to the under side of the wiper housing 28, creating continuous surface contact between the metals. Through conduction, the heating element 16 heats the wiper arm components 14, 30 to a temperature sufficient to eliminate the build-up of ice during inclement weather conditions. The electric heating element 16 is wired to the windshield wiper control unit 20 and the power source 22. The heating element 16 will keep the wiper arm 30 above freezing temperatures. The system can be activated by deploying a switch located on the wiper control unit 20 by the driver when ice and freezing weather conditions prevail.

13 Claims, 10 Drawing Sheets

HEATED WINDSHIELD WIPER BLADES

BACKGROUND OF THE INVENTION

Field of the Invention

The present invention relates generally to windshield wiper blades and, more specifically to windshield wiper assemblies that are capable of melting snow and ice and prevent these elements from building up on the wiper blades during inclement conditions.

The concept of the windshield wiper blade of the present invention is to prevent ice and snow from accumulating on the surface of the wiper blades. Within the wiper housing, an electrical heating element is welded to the under side of the wiper housing, creating continuous surface contact between the metals. Through conduction, the heating element heats the wiper arm components to a temperature sufficient to eliminate the build up of ice during inclement weather conditions. The electric heating element is wired to the windshield wiper control unit and the power source. A conduction heating element will keep the wiper arm above freezing temperatures.

The system can be activated by deploying a switch located on the wiper control unit by the driver when ice and freezing inclement weather prevails. The system could also be powered by the existing defrost power button stocked in many motor vehicles. The heating element is supplied in different sizes depending on the wiper housing size. Heater elements could extend to underside of the wiper arm as well.

SUMMARY OF THE PRESENT INVENTION

The present invention discloses an electrical heating element welded to the under side of the wiper housing, creating continuous surface contact between the metals. Through conduction, the heating element heats the wiper arm components to a temperature sufficient to eliminate the build-up of ice during inclement weather conditions. The electric heating element is wired to the windshield wiper control unit and the power source. The heating element will keep the wiper arm above freezing temperatures. The system can be activated by deploying a switch located on the wiper control unit by the driver when ice and freezing weather conditions prevail.

A primary object of the present invention is to provide a heating element for motor vehicle windshield wiper arms.

Another object of the present invention is to provide a wiper housing, consisting of an electrical heating element that is welded to the under side of the wiper housing, creating continuous surface contact between the metals.

Yet another object of the present invention is to provide a heated wiper unit that through conduction, the heating element heats the wiper arm components to a temperature sufficient to eliminate the build up of ice during inclement weather conditions.

Still yet another object of the present invention is to provide an electric heating element that is wired to the windshield wiper control unit and the power source.

Yet another object of the present invention is to provide a heating element system that can be activated by deploying a switch located on the wiper control unit by the driver when ice and freezing weather prevails.

Additional objects of the present invention will appear as the description proceeds.

The present invention overcomes the shortcomings of the prior art by providing windshield wiper blades that are capable of melting snow and ice and prevent these elements from building up on the wiper blades during inclement conditions. Also to provide a wiper housing, consisting of an electrical heating element that is welded to the under side of the wiper housing, creating continuous surface contact between the metals. Also an electric heating element that is wired to the windshield wiper control unit and the power source.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claim.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

| | |
|---|---|
| 10 | present invention |
| 12 | vehicle |
| 14 | wiper blade |
| 16 | heating element |
| 18 | wire |
| 20 | wiper control unit |
| 22 | power source |
| 24 | windshield wiper assembly |
| 26 | weld |
| 28 | wiper blade housing |
| 30 | wiper arm |
| 32 | wiper spring |
| 34 | cap |
| 36 | wire to power source |
| 38 | wire to wiper control unit |

-continued

| 40 | secondary heating element |
| 42 | extended power wire |

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
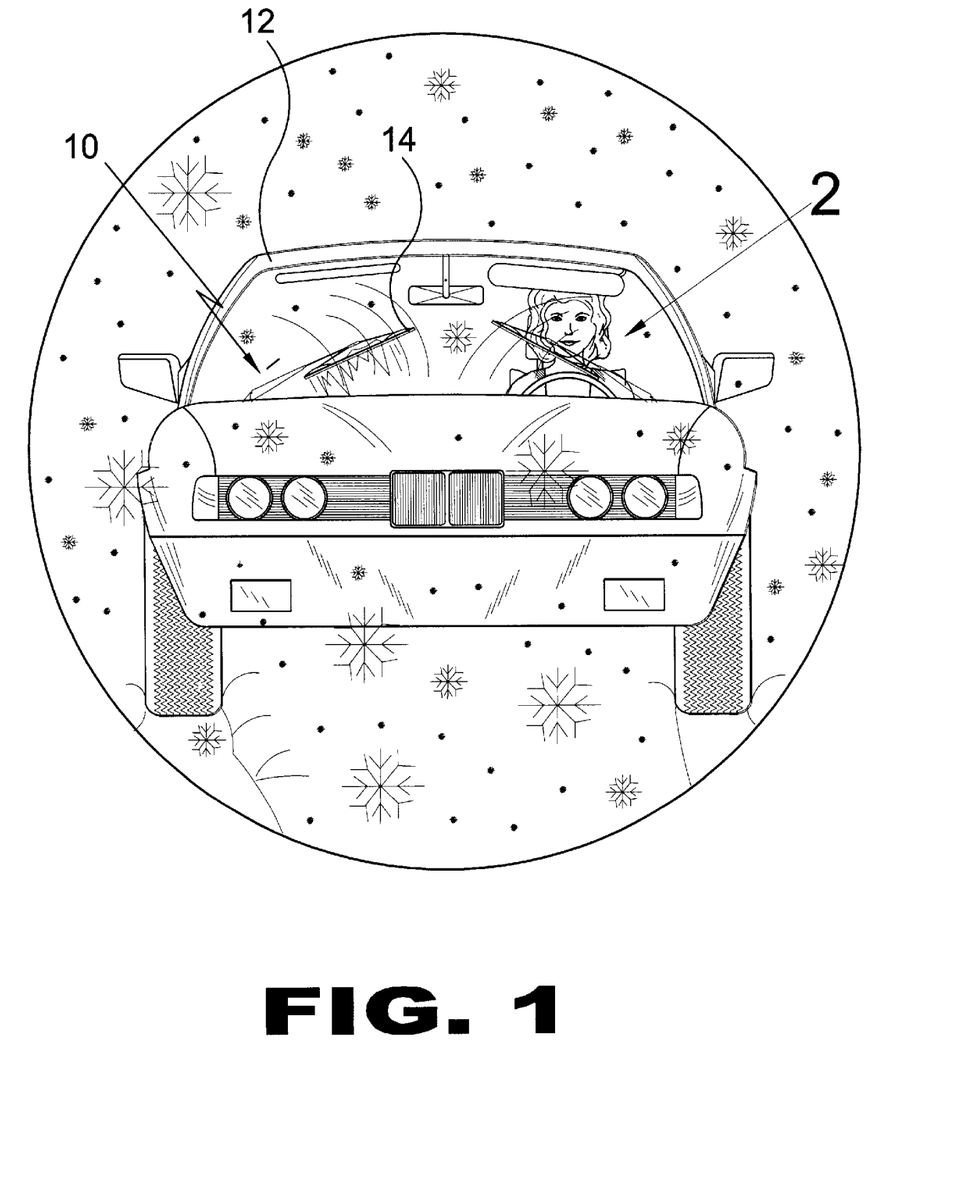
FIG. 1 is an illustrative view of the present invention in use.

Turning to FIG. 1, shown therein is an illustrative view of the present invention 10 in use on a vehicle 12. The concept of the windshield wiper conductive heater of the present invention is to prevent ice and snow from accumulating on the surface of the wiper blades 14. By way of general explanation, within the wiper housing, an electrical heating element is welded to the under side of the wiper housing, creating continuous surface contact between the heater and the wiper arm. Through conduction, the heating element heats the wiper arm components to a temperature sufficient to eliminate the build up of ice during inclement weather.

Figure 2:
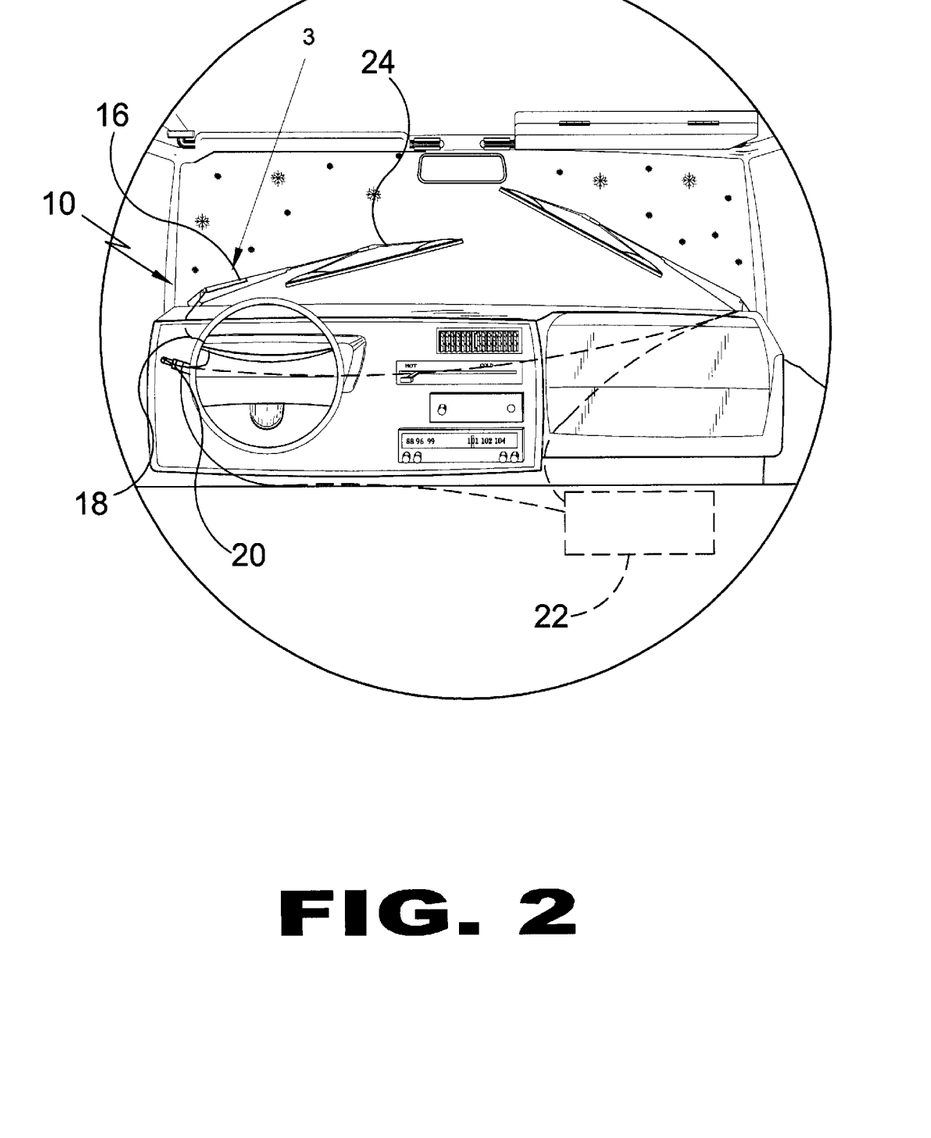
FIG. 2 is an illustrative view of the present invention in use.

Turning to FIG. 2, shown therein is an illustrative view of the present invention 10 in use on a windshield wiper assembly 24. The electric heater element 16 is wired 18 to the windshield wiper control unit 20 and the power source 22. It can be activated by deploying a switch located on the wiper control unit 20 by the driver when ice and freezing inclement weather prevails.

Figure 3:
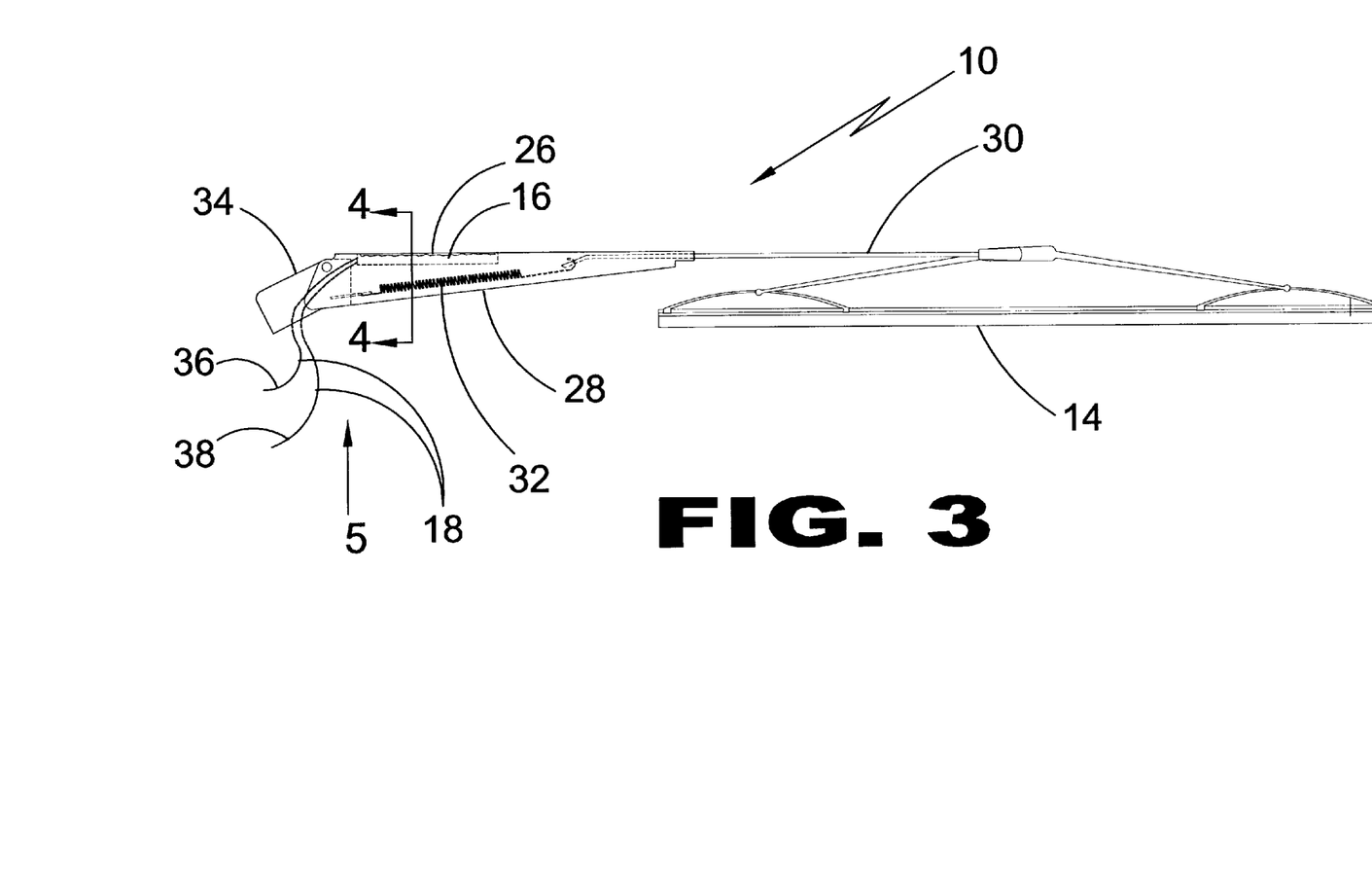
FIG. 3 is an elevation view of the present invention.

Turning to FIG. 3, shown therein is an elevation view of the present invention 10. The electrical heating element 16 is welded at 26 to the underside of the windshield wiper housing 28. When activated, it creates a continuous, contiguous surface contact between the heater element 16 and the wiper arm 30. Also shown are the wiper blade 14, wiper spring 32, cap 34, wires 18 with wire 36 to the power source and wire 38 to the wiper control unit.

Figure 4:
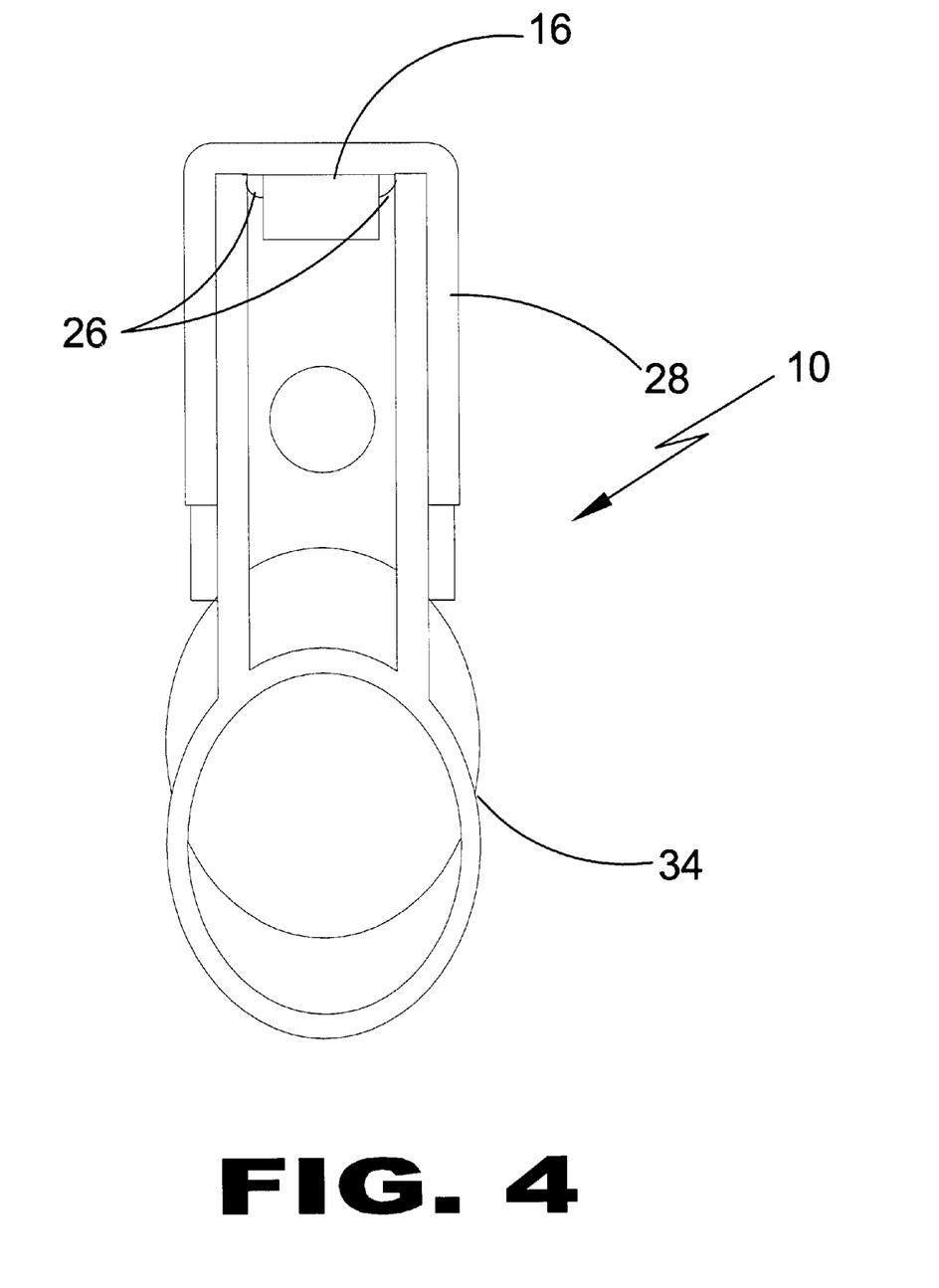
FIG. 4 is a sectional view of the present invention.

Turning to FIG. 4, shown therein is a sectional view of the present invention 10. Through conduction, the electrical heating element 16 heats the wiper arm components to a temperature sufficient to eliminate the build up of ice during inclement weather. Also shown are the wiper housing 28, the weld 26 and cap 34.

Figure 5:
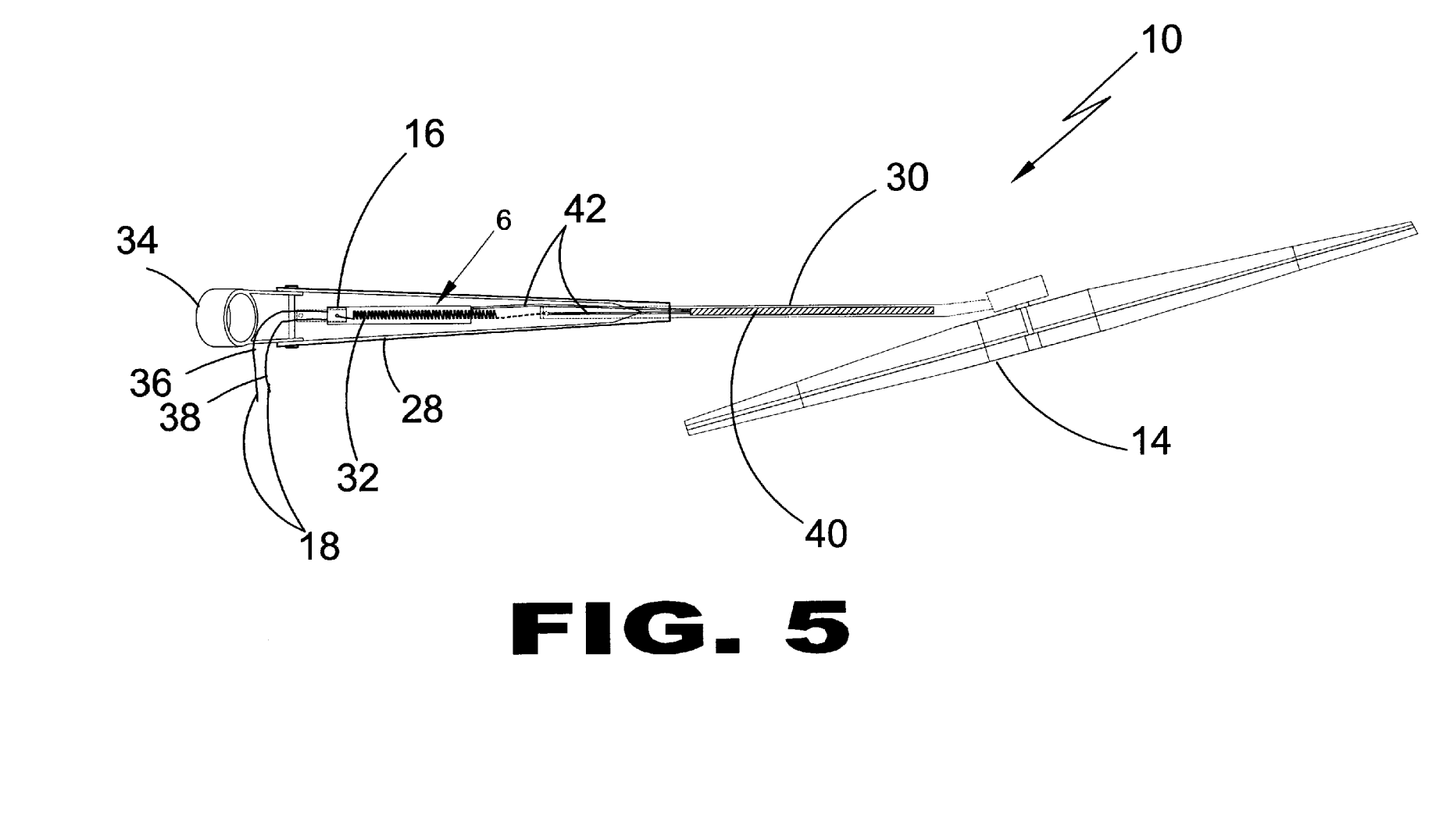
FIG. 5 is a bottom view of the present invention.

Turning to FIG. 5, shown therein is a bottom view of the present invention 10. The electrical heating element 16 is wired at 36, 38 to the windshield wiper control unit and power source. The heater element 16 is activated by the windshield wiper control unit and may be deployed at the command of the driver. The secondary heating element 40 assures constant surface heat between metals and is connected to heating element 16 by extended power wires 42. The heater element 16 may also be powered by the existing defrost unit power button stocked in many motor vehicles. Other elements previously disclosed are also shown.

Figure 6:
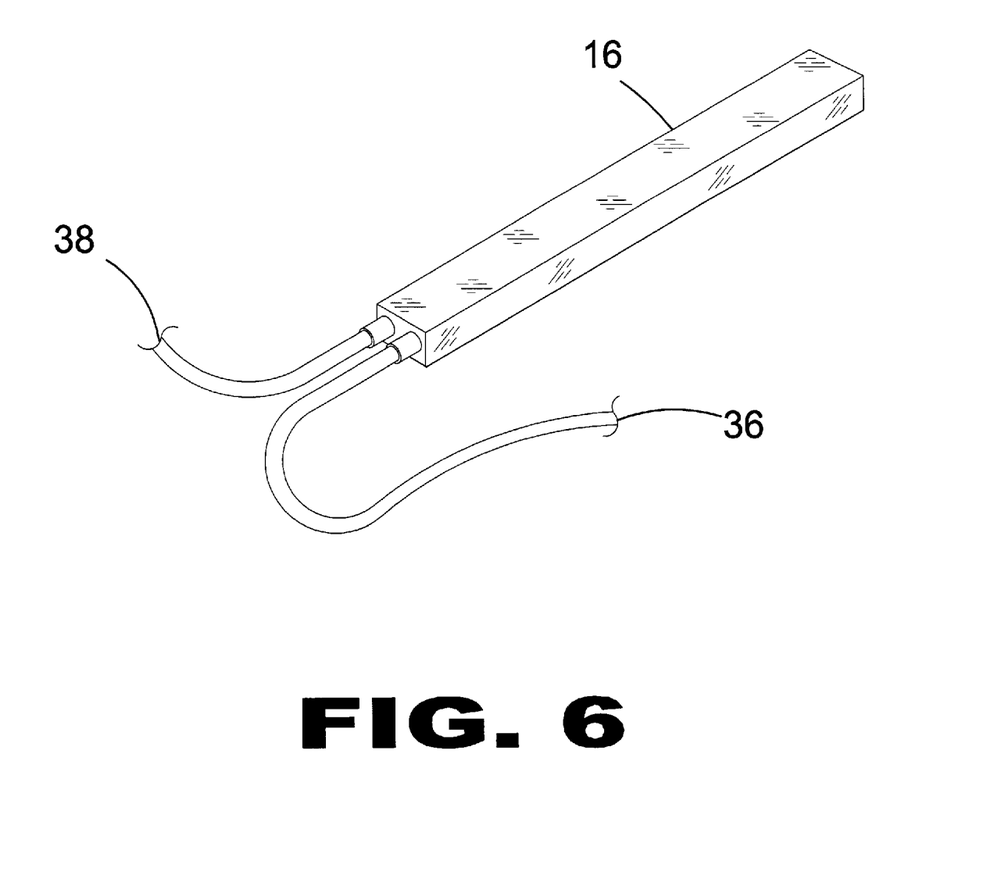
FIG. 6 is a detail view of the present invention.

Turning to FIG. 6, shown therein is a detail view of the heating element 16 of the present invention. The concept of the windshield wiper blade of the present invention is to prevent ice and snow from accumulating on the surface of the wiper blades. Within the wiper housing, an electrical heating element is welded to the under side of the wiper housing, creating continuous surface contact between the metals. Through conduction, the heating element heats the wiper arm components to a temperature sufficient to eliminate the build up of ice during inclement weather. The heating element is supplied in different sizes depending on the wiper housing size. Heating elements could extend to the underside of wiper arm as well. Also shown are wire 36 to the power source and wire 38 to the wiper control unit.

Figure 7:
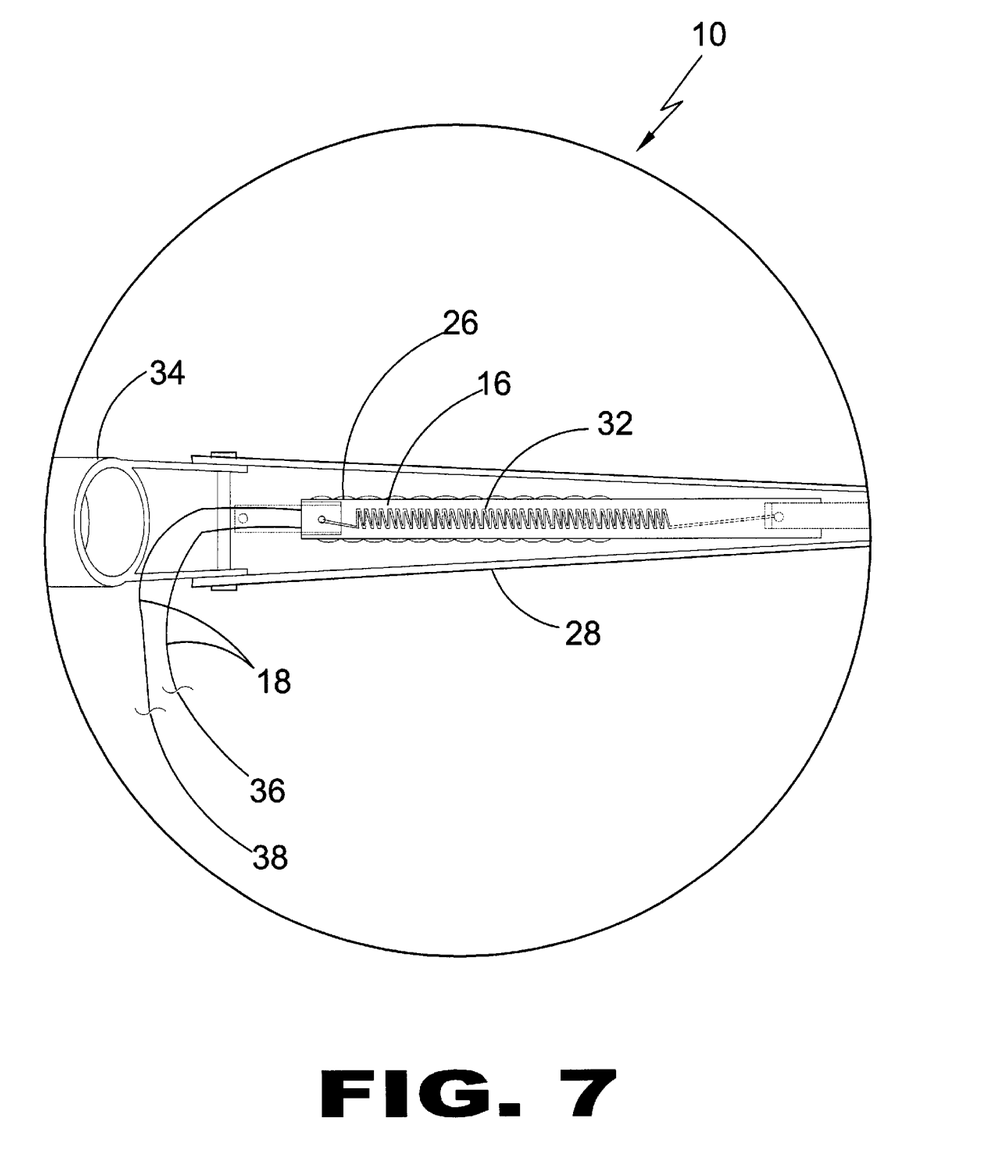
FIG. 7 is a detail view of the bottom portion of the present invention.

Turning to FIG. 7, shown therein is a detail view of the bottom portion of the present invention 10. An electrical heating element 16 is welded at 26 to the underside of the wiper housing 28, creating continuous surface contact between the metals. Through conduction the heating element heats the wiper arm components to a temperature sufficient to eliminate the build up of ice during inclement weather. Other elements previously disclosed are also shown.

Figure 8:
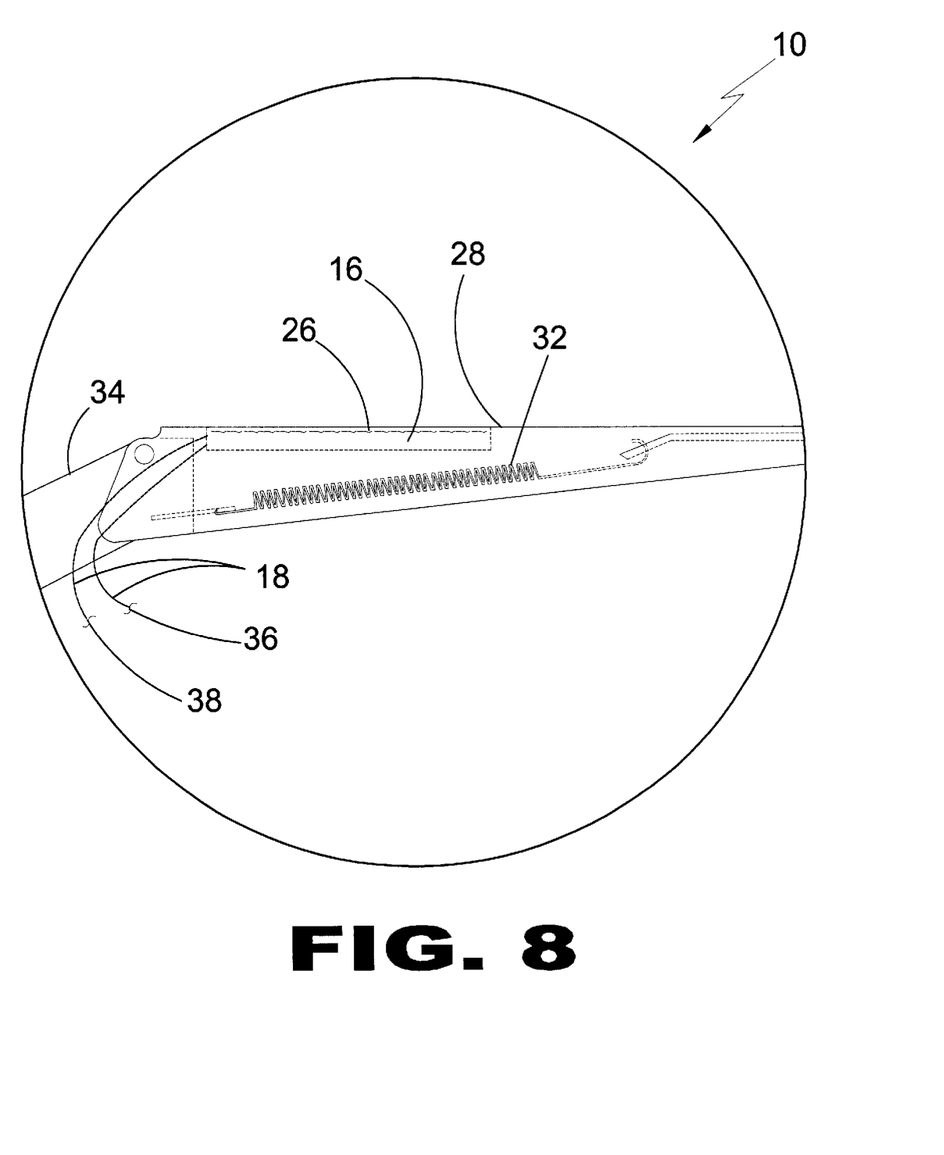
FIG. 8 is a side detail view of the present invention.

Turning to FIG. 8, shown therein is a side detail view of the bottom portion of the present invention 10. An electrical heating element 16 is welded at 26 to the underside of the wiper housing 28, creating continuous surface contact between the metals. Through conduction the heating element heats the wiper arm components to a temperature sufficient to eliminate the build up of ice during inclement weather. Other elements previously disclosed are also shown.

Figure 9:
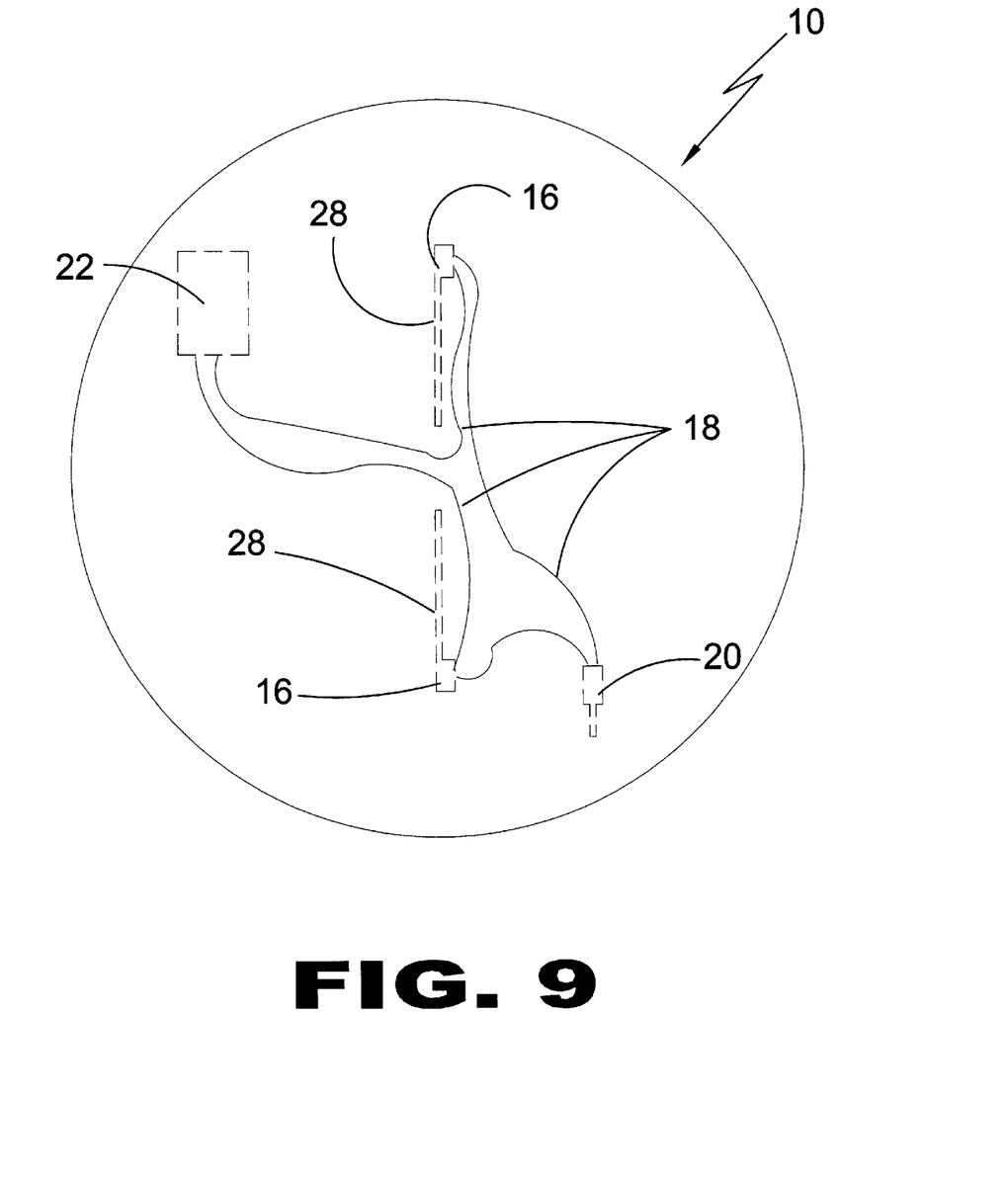
FIG. 9 is a top view of a vehicle equipped with the device of the present invention.

Turning to FIG. 9, shown therein is a top view of a vehicle equipped with the device of the present invention 10. The electrical heater element 16 is disposed on the wiper housing 28 and is wired at 18 to the windshield wiper control unit 20 and power source 22. The heater element 16 is activated by the windshield wiper control unit 20 and may be deployed at the command of the driver.

Figure 10:
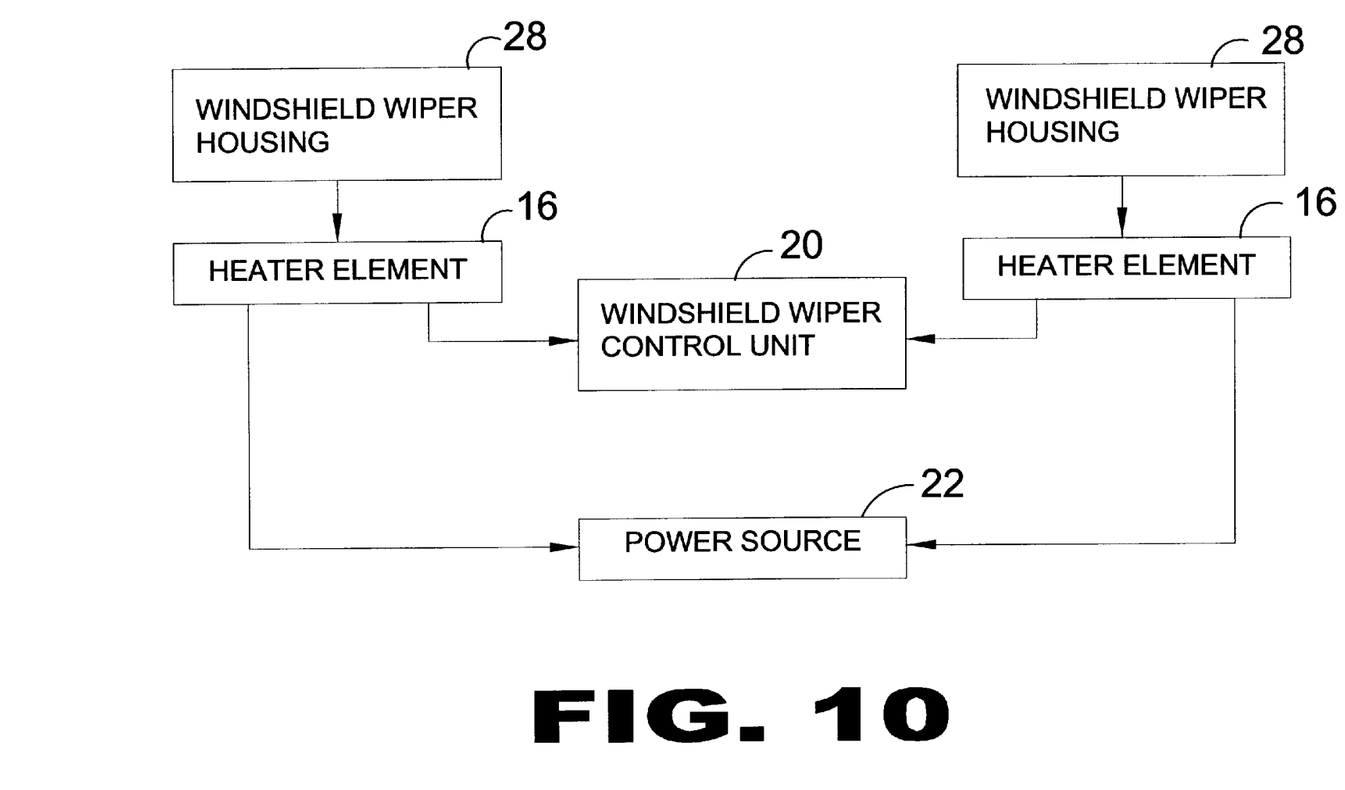
FIG. 10 is a block diagram of the present invention.

Turning to FIG. 10, shown therein is a block diagram of the present invention. The electrical heater element 16 is disposed on the wiper housing 28 and is wired to the windshield wiper control unit 20 and power source 22. The heater element 16 is activated by the windshield wiper control unit 20 and may be deployed at the command of the driver.

I claim:

1. In a conventional windshield wiper assembly for use on a vehicle, the wiper assembly having a metallic wiper housing having a cap connected thereto on one end and a metallic wiper arm connected to the other end, the wiper arm having a wiper blade connected thereto, the improvement comprising:

a) a first electrical heating element disposed on an underside of the wiper housing to warm the wiper housing during cold weather conditions, said first electrical heating element being metallic for conduction of heat therethrough and is welded to the wiper housing for conduction of heat therethrough;

b) means to control said first electrical heating element whereby the first heating element can be conventionally controlled, and, c) a power source for said first electrical heating element.

2. The apparatus of claim 1, further comprising a second heating element disposed on the underside of the wiper arm to warm the wiper arm during cold weather conditions.

3. The apparatus of claim 2, wherein said second heating element is metallic for conduction of heat therethrough.

4. The apparatus of claim 3, wherein said second heating element is welded to the wiper arm for conduction of heat therethrough.

5. The apparatus of claim 4, wherein said first heating element is complementarily sized to the wiper housing.

6. The apparatus of claim 5, wherein said first heating element is complementarily sized to the wiper arm.

7. The apparatus of claim 6, wherein said second heating element is electrically connected to said first heating element.

8. The apparatus of claim 7, wherein said means to control said first heating element further comprises a wiper control unit for controlling the first heating element.

9. The apparatus of claim 8, wherein said wiper control unit further comprises an on/off switch.

10. The apparatus of claim 9, wherein said wiper control unit further comprises on/off switch disposed internal the vehicle.

11. The apparatus of claim 10, wherein said first heating element is contiguous to the wiper housing.

12. The apparatus of claim 11, wherein said second heating element is contiguous to the wiper arm.

13. The apparatus of claim 12, wherein said power source is a power source for a defrost unit on the vehicle.

* * * * *